(12) United States Patent
Lyon et al.

(10) Patent No.: US 8,813,244 B1
(45) Date of Patent: *Aug. 19, 2014

(54) DEVELOPER SWITCH

(75) Inventors: Christopher T. Lyon, Santa Clara, CA (US); Randall R. Spangler, San Jose, CA (US); William F. Richardson, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/406,393

(22) Filed: Feb. 27, 2012

Related U.S. Application Data

(60) Provisional application No. 61/447,694, filed on Feb. 28, 2011.

(51) Int. Cl.
*G06F 7/00* (2006.01)
(52) U.S. Cl.
USPC ...... 726/27; 713/1; 713/2; 713/100; 713/164; 713/176
(58) Field of Classification Search
USPC ............... 713/1, 2, 100, 164, 176; 726/27
See application file for complete search history.

(56) References Cited

U.S. PATENT DOCUMENTS

| | | | |
|---|---|---|---|
| 6,185,678 B1 | 2/2001 | Arbaugh et al. | |
| 6,253,374 B1 | 6/2001 | Dresevic et al. | |
| 6,363,492 B1 | 3/2002 | James, Jr. et al. | |
| 7,549,922 B2 | 6/2009 | Falvey et al. | |
| 7,822,997 B2 | 10/2010 | Boerger | |
| 7,849,315 B2 | 12/2010 | Hardy et al. | |
| 7,853,780 B2 | 12/2010 | Rotondo et al. | |
| 8,001,581 B2 | 8/2011 | Ford et al. | |
| 8,131,987 B2 | 3/2012 | Lo et al. | |
| 2006/0218425 A1* | 9/2006 | Ding et al. | 713/323 |
| 2006/0290487 A1* | 12/2006 | McKinney | 340/506 |
| 2008/0010220 A1 | 1/2008 | Hobson et al. | |
| 2008/0165971 A1 | 7/2008 | de Cesare et al. | |
| 2008/0180412 A1* | 7/2008 | Tsang | 345/179 |
| 2009/0075726 A1* | 3/2009 | Stelzer et al. | 463/25 |
| 2009/0191961 A1 | 7/2009 | McCoull et al. | |
| 2009/0210702 A1 | 8/2009 | Welingkar et al. | |
| 2009/0227369 A1* | 9/2009 | Higbie et al. | 463/31 |

(Continued)

FOREIGN PATENT DOCUMENTS

WO  WO-2011/047061 A2  4/2011

OTHER PUBLICATIONS

Arbaugh, et al, "Automated Recovery in a Secure Bootstrap Process", Distributed System Laboratory, Nov. 21, 1997, 16 pages.

(Continued)

*Primary Examiner* — Beemnet Dada
*Assistant Examiner* — Sayed Beheshti Shirazi
(74) *Attorney, Agent, or Firm* — McDermott Will & Emery LLP

(57) ABSTRACT

A computing device comprising a security slot integral with an external surface of the computing device, wherein the security slot is configured to receive and mechanically cooperate with a blocking mechanism. In certain aspects, the computing device further comprises a switch mounted behind the security slot and integral to the computing device and configured to permit access to a developer mode when the switch is in a first position and to restrict access to the developer mode when the switch is in a second position.

19 Claims, 5 Drawing Sheets

(56) References Cited

U.S. PATENT DOCUMENTS

| | | | | |
|---|---|---|---|---|
| 2010/0180648 | A1* | 7/2010 | Knox | 70/58 |
| 2010/0235745 | A1* | 9/2010 | Shintani | 715/719 |
| 2011/0087870 | A1* | 4/2011 | Spangler et al. | 713/2 |
| 2012/0210113 | A1 | 8/2012 | Wood et al. | |
| 2013/0023338 | A1* | 1/2013 | Layne, IV | 463/25 |
| 2013/0035155 | A1* | 2/2013 | Layne, IV | 463/25 |

OTHER PUBLICATIONS

Miller, "The Secret to Palm Pre Dev Mode Lies in the Konami Code", engadget, retrieved on Feb. 8, 2011 from http://www.engadget.com/2009/06/10/the-secret-to-palm-pre-dev-mode-lies-i-n-the-konami-code/, Jun. 10, 2009, 4 pages.

"Mini Switch Under Battery", Maemo.org, retrieved on Feb. 8, 2011 from http://talk.maemo.org/showthread.php?t=12802, Jun. 12, 2007, 4 pages.

"OLPC Firmware q2e18", OLPC Project, retreived on Feb. 8, 2011 from http://wiki.laptop.org/go/OLPC.sub.—Firmware.sub.—q2e18, Sep. 17, 2008, 6 pages.

"Firmware Boot and Recovery", The Chromium Projects, Nov. 19, 2009, 14 pages.

"The Chromium Projects-Compare two versions", Jan. 25, 2010, 9 pages.

\* cited by examiner

DEVELOPER SWITCH

This application claims the benefit of U.S. Provisional Application No. 61/447,694, filed Feb. 28, 2011, which is incorporated by reference herein.

BACKGROUND

The subject disclosure relates generally to developer switches. Specifically, the present invention relates to the placement of a developer switch on a computing device.

A device from a manufacturer may have a developer switch that when activated, switches an operating system (OS) associated with the device from its normal use mode to a developer mode. However, when the same OS is used on a third party device (e.g., a device from a different manufacturer), the third party device may not have a developer switch to switch the OS into the developer mode. Thus, developers may not be able to access the developer mode using the third party device, thereby making the third party device unusable for the developers and/or preventing developers from using the developer mode to diagnose system problems (e.g., during an RMA process at the manufacturer).

SUMMARY

According to various aspects of the subject technology, a developer switch may be installed on all devices that are compatible with a particular OS, including third party devices. Thus, developers may be able to beneficially switch the OS from the normal use mode to the developer mode on any device compatible with the particular OS. In some aspects, the developer switch may be placed in a secure location of a device to prevent certain users of the device from accessing and activating the developer switch to switch the OS to the developer mode. In some aspects, the developer switch can be placed within and/or behind a Kensington security slot of a device, thereby making it more difficult for a user to accidentally access and activate the developer switch.

The disclosed subject matter relates to a computing device comprising a security slot integral with an external surface of the computing device, wherein the security slot is configured to receive and mechanically cooperate with a blocking mechanism, a switch mounted behind the security slot and integral to the computing device and configured to permit access to a developer mode when the switch is in a first position and to restrict access to the developer mode when the switch is in a second position.

The disclosed subject matter also relates to a method of controlling access to a developer switch, comprising, integrating a security slot with an external surface of a computing device, wherein the security slot is configured to receive and mechanically cooperate with a blocking mechanism and electrically coupling a switch to the computing device, wherein the switch is configured to permit access to a developer mode when the switch is in a first state and to restrict access to the developer mode when the switch is in a second state. In certain aspects, the blocking mechanism is configured to prevent changing a state of the switch when the blocking mechanism is mechanically cooperated with the security slot.

In yet another example, the subject technology also relates to a computing device comprising, a switch electrically coupled to a computing device and configured to permit access to a developer mode and a security slot integral with an external surface of the computing device, wherein the security slot is configured to receive and mechanically cooperate with a blocking mechanism and wherein the blocking mechanism is configured to prevent changing a state of the switch when the blocking mechanism is mechanically cooperated with the security slot.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, for the purpose of explanation, several embodiments of the subject technology are set forth in the following figures.

DETAILED DESCRIPTION

Figure 1:
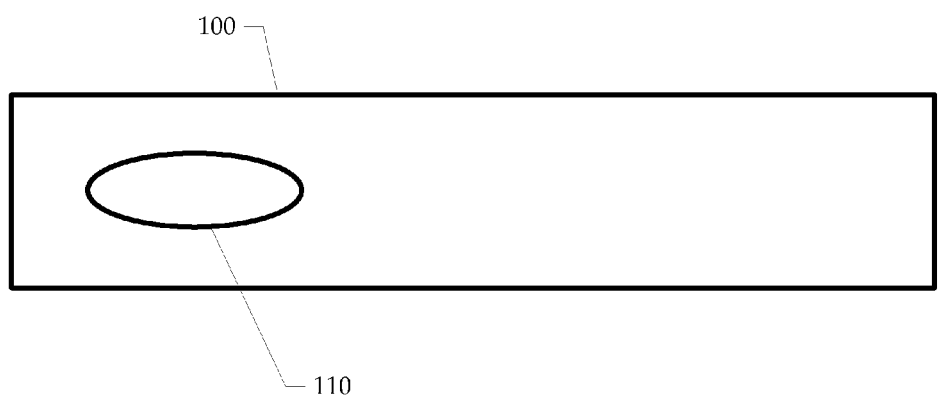
FIG. 1 illustrates an example of a security slot integrated with an external surface, according to some aspects of the subject disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

According to various aspects of the subject technology, a developer switch may be installed on all devices that are compatible with a particular OS, including third party devices. For example, a device may be an enterprise OS device that is compatible with a specific OS. In one example, the developer switch is a physical switch that can partially disable a given OS verified boot so that a developer can run a self-signed OS (e.g., a developer mode) instead of the official OS release (e.g., a normal use mode). By installing the developer switch on all devices compatible with a particular OS, developers may be able to beneficially switch the OS from the normal use mode to the developer mode on any device compatible with the particular OS. For example, by installing the developer switch on all devices, third party devices (which may also be referred to as second-hand machines) may be fully usable by developers.

In some aspects, enterprise information technology (IT) departments may need to restrict use of the developer switch, so that the IT departments can ensure that users are only using an official version of a particular OS. In some aspects, the developer switch may be placed in a secure location of a device to prevent normal users of the device from accidentally accessing and activating the developer switch to switch the OS to the developer mode. This can be accomplished by putting the developer switch on the inside of a case of a device and making the developer switch accessible through a Kensington security slot of the device. The Kensington security slot may be present on many types of enterprise devices. When the device is locked to a desk, for example, a lock that engages the security slot (e.g., a Kensington lock) may be used to block access to the slot, making the developer switch physically inaccessible. The Kensington security slot specifications may be compatible with this use, since the specifications only specify a certain amount of clearance needed for active electrical components. In some aspects, a top of the developer switch is made of plastic (or some other suitable non-conducting material) so as not to cause a short when a lock is inserted into the slot, even if the lock makes contact with the switch.

In some aspects, the subject technology is compatible with software/firmware solutions which lock down the developer mode via a trusted platform module (TPM). According to certain aspects, with a more complex mechanism, the developer mode may even be prevented from being active at all when the lock is engaged. Rather than just blocking access to the developer switch, a pin or other obstruction can be introduced to prevent the device from being locked with the switch in an insecure position. This may be a useful check step for an enterprise deployment, and may provide an added level of security if a user were to disconnect the lock, flip the switch, and re-engage the lock without detection.

According to certain aspects, any suitable methods may be used to detect whether or not the lock is engaged so that an administrator (e.g., an IT manager) may obtain quick confirmation that every device part of the administrator's system is locked down and accounted for.

In some aspects, the developer switch may be placed adjacent to the lock and/or the Kensington security slot, with a physical interlock so that the developer switch may be prevented from moving while the lock is inserted. The lock may not block access to the developer switch, but may prevent the switch from being actuated.

A clearance requirement may be needed for an attached lock. This may be addressed by, for example, placing the lock (or the developer switch) further in the case and/or mounting the developer switch sideways behind its own slot perpendicular to the security slot. In certain aspects, providing for adequate clearance may also be accomplished by providing a slot-shaped shield in front that is perpendicular to the security slot (e.g., require a point object to lever sideways in the security slot to flip the developer switch).

FIG. 1 illustrates an example of a security slot, according to some aspects of the subject disclosure. Specifically, FIG. 1 depicts an external surface 100 of a computing device having a security slot 110 disposed thereon. The depicted security slot 110 is shown with an elliptical geometry; however, the security slot 110 may have any shape or geometry, depending on the desired implementation.

The external surface 100 can comprise the external surface of any computing device, such as a mobile computing device (e.g., a laptop computer, table based computing device, PDA etc.). In some aspects, the external surface 100 can be a part of the case of a non-mobile computing device, such as a personal computer (PC), server or workstation tower, etc.

In practice, the security slot 110 will be configured such that access can be gained to an interior portion of the external surface 100 (such as via a mobile or personal computer case), via the security slot 110.

Figure 2:
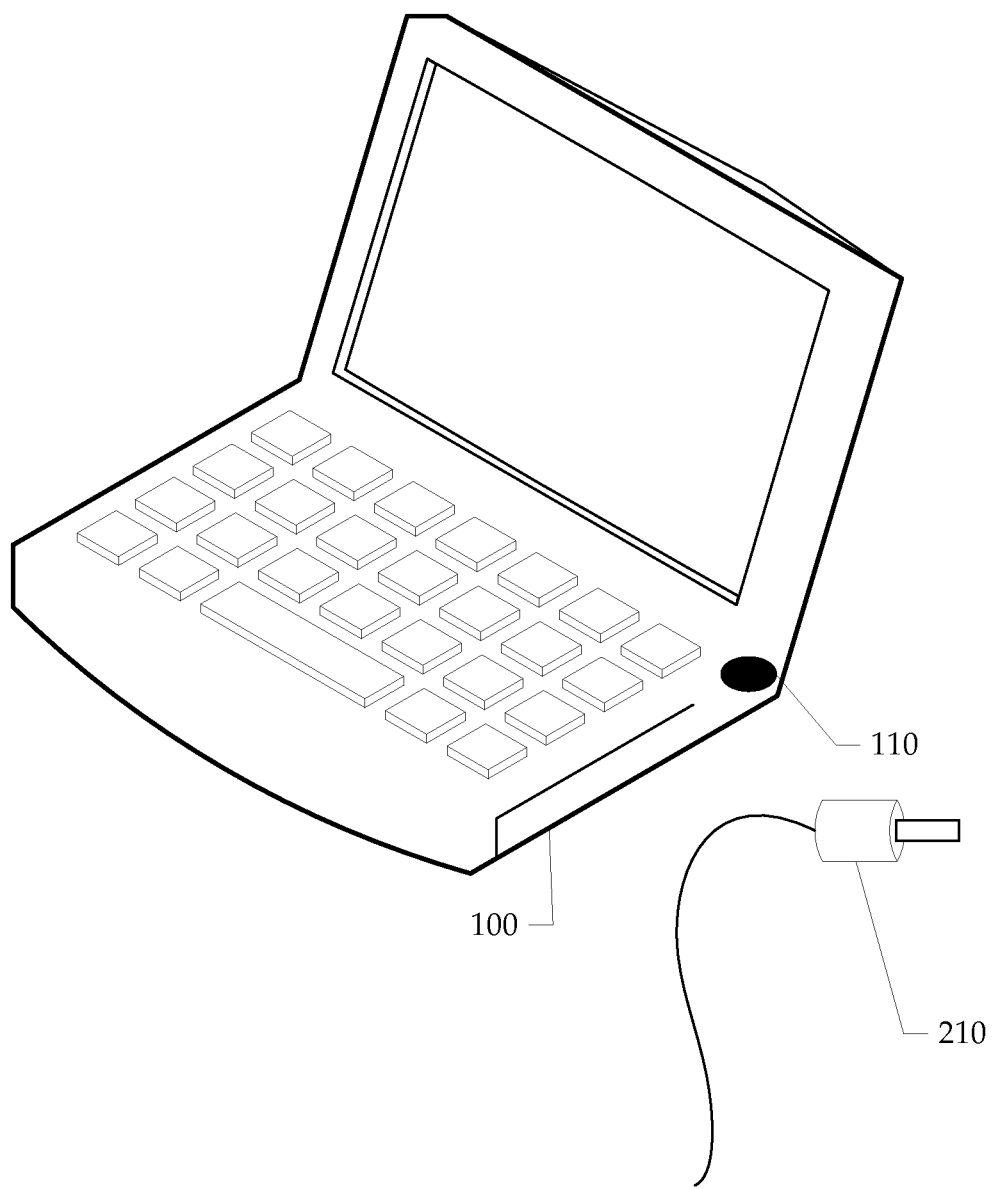
FIG. 2 illustrates a security slot integrated into a computing device case, together with a blocking mechanism, according to some aspects of the subject disclosure.

FIG. 2 illustrates a computing device 200 having an external surface 100 with a security slot 110 integrated therewith. FIG. 2 further illustrates an example of a blocking mechanism 210, according to some aspects of the subject disclosure.

The blocking mechanism 210 can comprise essentially any device that can be mechanically cooperated with the security slot 110. In some aspects, the blocking mechanism 210 can cooperate with the security slot 110 such that access to an interior side of the external surface 100 will be obstructed. By way of example, the blocking mechanism can comprise a locking device, such as a security lock.

Figure 3:
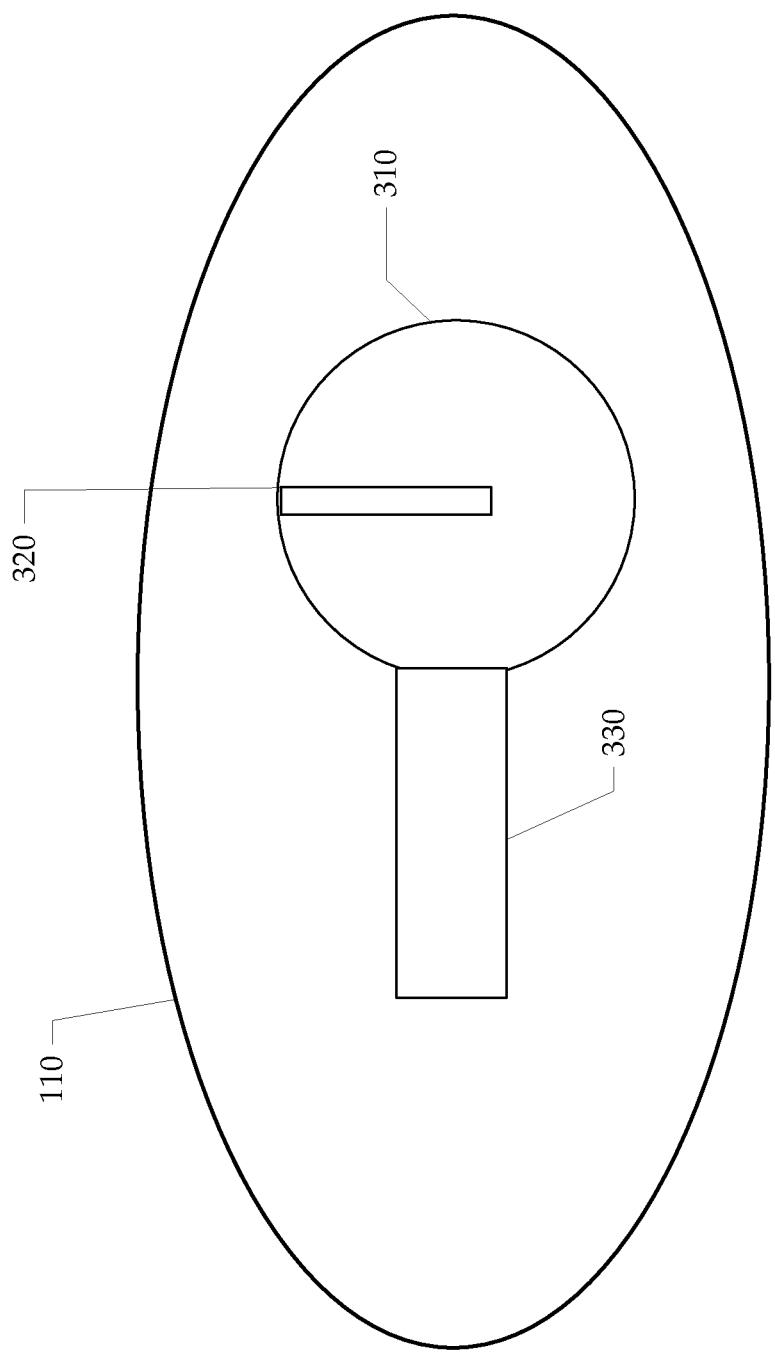
FIG. 3 illustrates a switch mounted behind a security slot, according to some aspects of the subject disclosure.

FIG. 3 illustrates a switch 310, having a mode indicator 320 and a switch pin 330. Although the switch 310 can be mounted anywhere on a computing device, as illustrated the switch 310 is mounted behind a security slot 110. The switch 310 can comprise any type of switching device. By way of example, the switch 310 may comprise a mechanical, optical or electro-mechanical switching device. Additionally, the switch 310 may be constructed of any suitable material; however, in some aspects the exterior surface of the switch 310 will comprise a non-conductive material so that the switch does not electrically interact if contacted by a conductive material, such as a metallic blocking mechanism. In certain implementations, the switch 310 is a mechanical switch that is electrically coupled to a computing device (e.g., the computing device 200 of FIG. 2) housed within a case (e.g., the external surface 100, as discussed above with respect to FIG. 1).

The mode indicator 320 can be used to indicate a mode or state of the switch 310. For example, the switch 310 may be in either a "normal" mode or a "developer" mode. As used herein, "normal mode" refers to a state wherein the switch 310 is configured to limit user access to certain options and features of the computing device. Similarly the "developer mode" refers to a state wherein the switch enables user access to options or features of the computing device that are not permitted when the switch is placed in "normal mode." By way of example, placing the computing device in "developer" mode will enable the user to access and/or change the configuration of firmware and/or software on the computing device, such as, options related to the operation system (OS) of the computing device.

In certain aspects, the mode indicator 320 may be configured to facilitate the switching of the switch 310 between the normal and the developer modes. For example, the mode indicator may comprise a groove or indentation for cooperation with a tool (e.g., a screw driver) that may be used to change the position/state of the switch 310.

In certain implementations, cooperation of the blocking mechanism (such as a locking device), with the computing device, will have no effect on the state of the switch 310. For example, if the switch 310 is placed in a "normal" mode, subsequent cooperation with the blocking mechanism will not change the state of the switch 310, i.e., the switch will simply remain in the normal mode, although access to the switch 310 may be restricted. In some implementations, the blocking mechanism may not obstruct access to the switch, however, cooperation of the blocking mechanism (e.g., a lock) may prevent a changing of the state of the switch (e.g., from the normal mode into the developer mode).

In other aspects, when a blocking mechanism (e.g., a locking device) is cooperated with the security slot 110, the state of the switch may be changed. In some examples, the state of the switch may be changed by simply inserting the blocking mechanism into the security slot 110. By way of example, if the switch 310 placed in a "developer" mode (e.g., allowing a user to access certain restricted features and options of the computing device), the act of mechanically cooperating the blocking mechanism with the security slot will change the state of the switch 310 (e.g., into the "normal" mode).

The switch 310 can also be configured such that the state of the switch 310 will change depending on whether the lock of the blocking mechanism is in a "locked" or "unlocked" state. For example, the mere cooperation of a lock into the security slot 110 may have no direct effect on the state of the switch 310; however, when the lock is locked, the state of the switch can change correspondingly. By way of example, if the switch 310 is in "developer mode," locking the lock may place the switch 310 into the "normal mode." Similarly, if the switch 310 is initially in the "normal mode," a change of the lock state may also move the switch into the "developer mode."

Figure 4A:
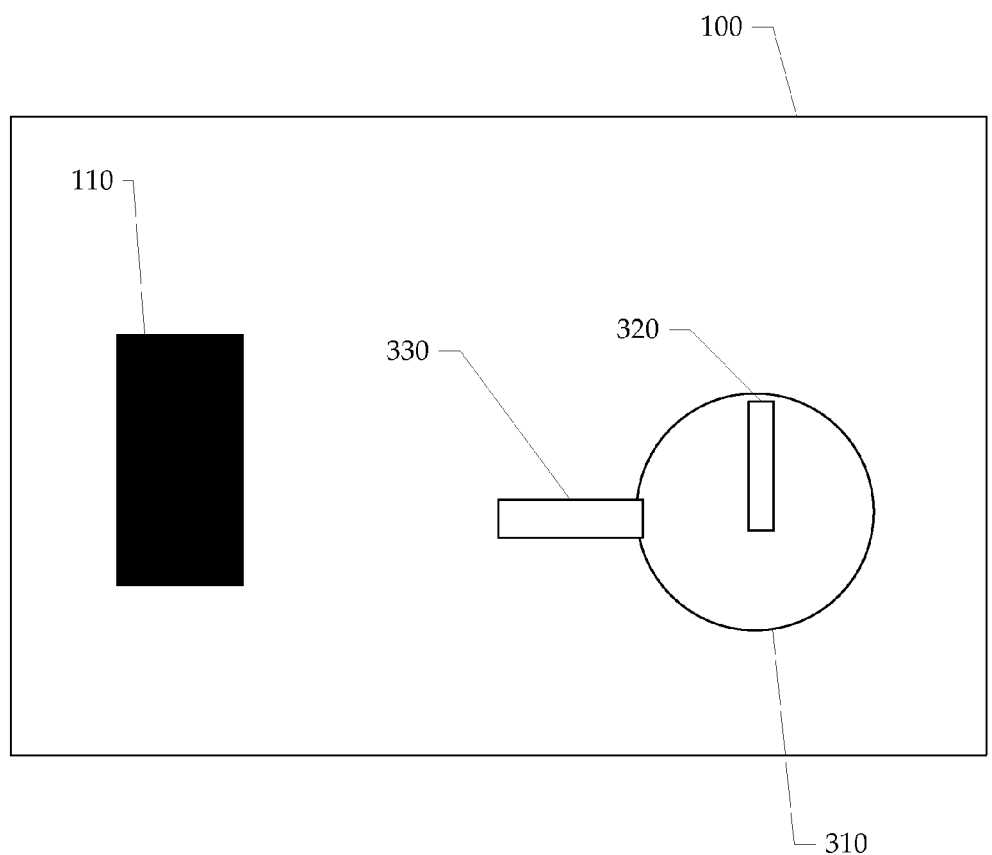
FIG. 4A illustrates a switch positioned in a normal mode, according to some aspects of the subject disclosure.

FIG. 4A illustrates a switch positioned in a "normal mode," according to some aspects of the subject disclosure. Specifically, FIG. 4A shows an interior view of external surface 100 (e.g., an interior view of the case of a computing device), a security slot 110 and a switch 310 comprising a mode indicator 320 and a switch pin 330. In certain aspects, the physical orientation of the mode indicator 320 will indicate whether the switch 310 is in a normal mode or a developer mode. In the example illustrated in FIG. 4A, the vertical orientation of the mode indicator 320 indicates that the switch is placed in a normal mode.

Although the switch 310 may function either with or without a switch pin 330, in the example illustrated in FIG. 4A the switch 310 is mechanically cooperated with switch pin 330. In some aspects, the switch pin 330 can facilitate the moving of the switch 310 between normal and developer states. In practice, the switch 310 may be actuated by a tool that is inserted through the security slot 110.

Figure 4B:
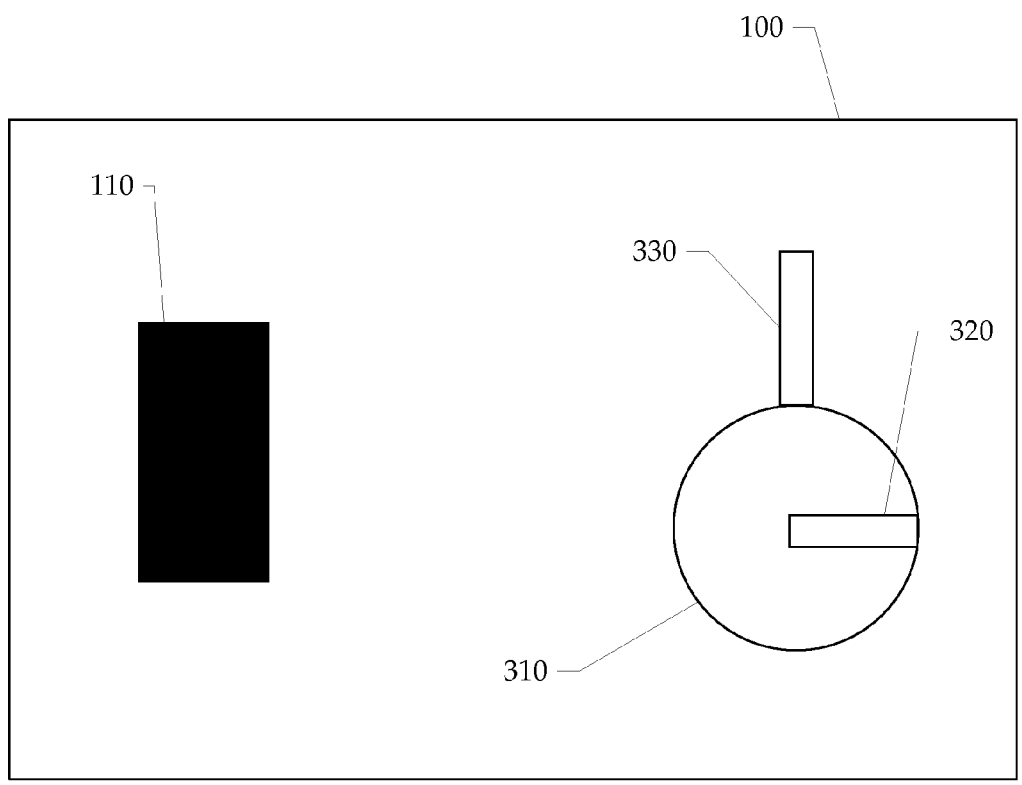
FIG. 4B illustrates a switch positioned in a developer mode, according to some aspects of the subject disclosure.

FIG. 4B illustrates the switch 310 of FIG. 4A, after the switch has been placed in a "developer mode" state. In some aspects, a pin or other simple tool may be inserted into the security slot 110 to activate the developer switch in order to place the OS in the "developer mode." In other aspects, the developer switch may be readily accessible, for example, to the hand of a user, as long as a lock or other blocking mechanism is not obstructing access. As shown in FIG. 4B, the mode indicator 320 is horizontally oriented with respect to the placement shown in FIG. 4A. Although, the mode indicator 320 may be placed in any desired orientation to indicate a particular state, in the example illustrated in FIG. 4B, a horizontal orientation is indicative the switch 310 being placed in the "developer mode."

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computing device comprising:
   a security slot integral with an external surface of the computing device, wherein the security slot is configured to receive and mechanically cooperate with a removable blocking mechanism; and
   a switch electrically coupled to the computing device and configured to permit access to a developer mode when the switch is in a first state and to restrict access to the developer mode when the switch is in a second state, wherein the security slot is configured to obstruct access to the switch when the removable blocking mechanism is mechanically cooperated with the security slot, wherein the security slot is configured to allow access to the switch by a user's hand via the security slot when the removable blocking mechanism is absent,
   wherein the removable blocking mechanism comprises a lock.

2. The computing device of claim 1, wherein the developer mode relates to a mode of operation for one or more software programs executable by the computing device.

3. The computing device of claim 2, wherein the one or more software programs comprise one or more operating systems of the computing device.

4. The computing device of claim 1, wherein the switch comprises a mechanically movable element and wherein the switch is configured to be in the first state when the mechanically movable element is in a first position and the switch is configured to be in the second state when the mechanically movable element is in a second position.

5. The computing device of claim 1, wherein the removable blocking mechanism is configured to place the switch into the second state when the removable blocking mechanism is mechanically cooperated with the security slot.

6. The computing device of claim 1, wherein the removable blocking mechanism comprises a lock.

7. A method of controlling access to a developer switch, comprising:
- integrating a security slot with an external surface of a computing device, wherein the security slot is configured to receive and mechanically cooperate with a removable blocking mechanism; and
- electrically coupling a switch to the computing device, wherein the switch is configured to permit access to a developer mode when the switch is in a first state and to restrict access to the developer mode when the switch is in a second state and wherein the removable blocking mechanism is configured to prevent changing a state of the switch when the removable blocking mechanism is mechanically cooperated with the security slot, wherein the security slot is configured to allow access to the switch by a user's hand via the security slot when the removable blocking mechanism is absent,
- wherein the security slot is an opening sized and shaped to receive the removable blocking device.

8. The method of claim 7, wherein the developer mode relates to a mode of operation for one or more firmware or software routines executable by the computing device.

9. The method of claim 8, wherein the one or more firmware or software routines comprise one or more operating systems of the computing device.

10. The method of claim 7, wherein the switch comprises a mechanically movable element and wherein the switch is configured to be in the first state when the mechanically movable element is in a first position and the switch is configured to be in the second state when the mechanically movable element is in a second position.

11. The method of claim 7, wherein the security slot is configured to obstruct access to the switch when the removable blocking mechanism is mechanically cooperated with the security slot.

12. The method of claim 7, wherein the removable blocking mechanism is configured to prevent movement of the switch when the removable blocking mechanism is mechanically cooperated with the security slot.

13. The method of claim 7, wherein the removable blocking mechanism is configured to place the switch into the second state when the removable blocking mechanism is mechanically cooperated with the security slot.

14. The method of claim 7, wherein the removable blocking mechanism comprises a lock.

15. A computing device comprising:
- a security slot integral with an external surface of the computing device, wherein the security slot is configured to receive and mechanically cooperate with a removable blocking mechanism; and
- a switch electrically coupled to the computing device and configured to permit access to a developer mode when the switch is in a first state and to restrict access to the developer mode when the switch is in a second state, wherein the removable blocking mechanism is configured to prevent movement of the switch when the removable blocking mechanism is mechanically cooperated with the security slot, wherein the security slot is configured to allow access to the switch by a user's hand via the security slot when the removable blocking mechanism is absent,
- wherein the removable blocking mechanism comprises a lock.

16. The computing device of claim 15, wherein the developer mode relates to a mode of operation for one or more software programs executable by the computing device.

17. The computing device of claim 15, wherein the switch comprises a mechanically movable element and wherein the switch is configured to be in the first state when the mechanically movable element is in a first position and the switch is configured to be in the second state when the mechanically movable element is in a second position.

18. The computing device of claim 15, wherein the security slot is configured to obstruct access to the switch when the removable blocking mechanism is mechanically cooperated with the security slot.

19. A computing device comprising:
- a switch electrically coupled to a computing device and configured to permit access to a developer mode; and
- a security slot integral with an external surface of the computing device, wherein the security slot is configured to receive and mechanically cooperate with a removable blocking mechanism and wherein the removable blocking mechanism is configured to prevent changing a state of the switch when the removable blocking mechanism is mechanically cooperated with the security slot, wherein the security slot is configured to allow access to the switch by a user's hand via the security slot when the removable blocking mechanism is absent,
- wherein the security slot is an opening sized and shaped to match the size and shape of the received portion of the removable blocking device.

\* \* \* \* \*